(12) United States Patent
Dadalto et al.

(10) Patent No.: US 9,999,199 B1
(45) Date of Patent: Jun. 19, 2018

(54) PET TOY WITH EDIBLE FORMULATION

(71) Applicant: HIMALAYAN CORPORATION, Mukilteo, WA (US)

(72) Inventors: Sharon L. Dadalto, Normandy Park, WA (US); Suman K. Shrestha, Marysville, WA (US)

(73) Assignee: HIMALAYAN CORPORATION, Mukilteo, WA (US)

( * ) Notice: Subject to any disclaimer, the term of this patent is extended or adjusted under 35 U.S.C. 154(b) by 0 days. days.

(21) Appl. No.: 15/426,609

(22) Filed: Feb. 7, 2017

(51) Int. Cl.
*A01K 29/00* (2006.01)
*A01K 15/02* (2006.01)

(52) U.S. Cl.
CPC .......... *A01K 15/025* (2013.01); *A01K 15/021* (2013.01)

(58) Field of Classification Search
CPC ... A01K 15/025; A01K 15/026; A01K 5/0114
USPC ..... 119/707, 710, 709, 711, 702, 708, 51.01
See application file for complete search history.

(56) References Cited

U.S. PATENT DOCUMENTS

| | | | | |
|---|---|---|---|---|
| 1,513,773 A | * | 11/1924 | Thompson | A63B 67/10 473/576 |
| 3,706,140 A | * | 12/1972 | Brillaud | D06F 58/203 118/726 |
| 5,009,193 A | * | 4/1991 | Gordon | A01K 15/025 119/707 |
| 5,778,825 A | * | 7/1998 | Krietzmen | A01K 15/025 119/708 |
| 6,880,765 B2 | * | 4/2005 | Tuomikoski | A61L 9/12 239/34 |
| D625,469 S | | 10/2010 | Dubitsky et al. | |
| D631,294 S | | 1/2011 | Dubitsky et al. | |
| D644,939 S | | 9/2011 | Teller | |
| 8,225,747 B2 | * | 7/2012 | Markham | A01K 15/025 119/51.01 |
| 8,367,130 B1 | * | 2/2013 | Tsengas | A23K 40/00 119/711 |
| 8,444,337 B2 | | 5/2013 | Teller | |
| 8,888,391 B2 | | 11/2014 | Teller et al. | |
| 2011/0226187 A1 | * | 9/2011 | Bertsch | A01K 5/0114 119/61.55 |
| 2012/0012068 A1 | * | 1/2012 | Costello | A01K 15/025 119/707 |
| 2013/0055965 A1 | * | 3/2013 | Valle | A01K 15/025 119/710 |
| 2014/0373788 A1 | * | 12/2014 | Ragonetti | A01K 15/025 119/51.01 |

* cited by examiner

*Primary Examiner* — Trinh T Nguyen
(74) *Attorney, Agent, or Firm* — Nathaniel A. Gilder; Jensen & Puntigam, PS

(57) ABSTRACT

A pet toy with edible formulation may include a substantially spherical housing comprising a first hemisphere and a second hemisphere which are releasably couplable. An edible formulation may be bonded to an internal sidewall inside at least one of the first and second hemispheres, such that the edible formulation is accessible by releasing the first hemisphere from the second hemisphere.

21 Claims, 4 Drawing Sheets

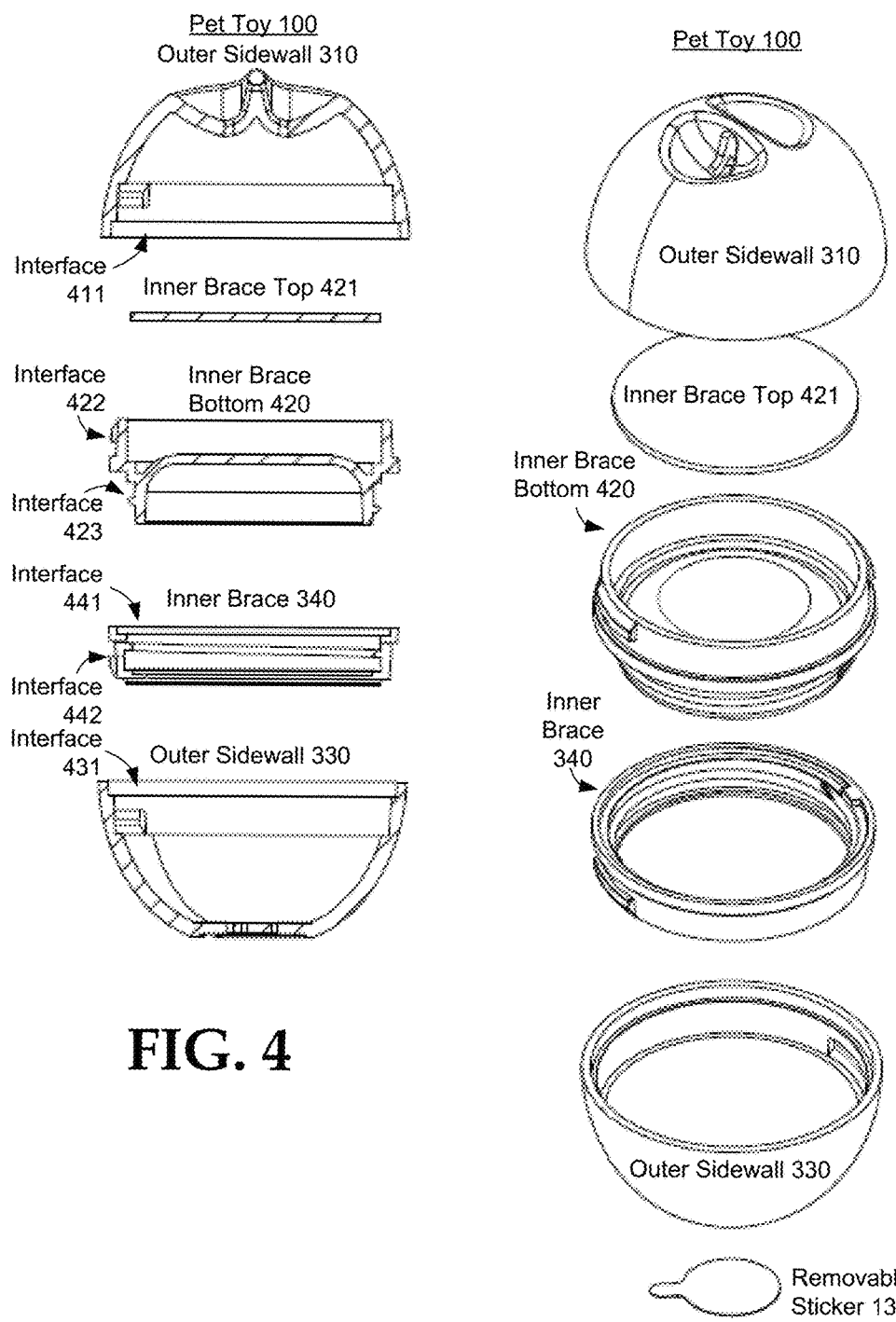

PET TOY WITH EDIBLE FORMULATION

BACKGROUND

While numerous different pet toys, treats and training tools have been created, there is an ongoing need to provide pets and their owners with fun, interesting and novel pet toys.

SUMMARY

A pet toy with edible formulation is disclosed. Example pet toys may comprise releasably couplable members, such as hemispheres, which members may be releasable and re-couplable by pet owners, and not by the pets themselves. The edible formulations may be integrated inside one or more of the releasably couplable members, so that the edible formulations are inaccessible by the pet when the members are coupled together, and the edible formulations are accessible by the pet when the members are released or decoupled. Additional aspects of this disclosure are described in further detail below.

BRIEF DESCRIPTION OF THE DRAWINGS

Various features and attendant advantages of the disclosed technologies will become fully appreciated when considered in conjunction with the accompanying drawings, in which like reference characters designate the same or similar parts throughout the several views, and wherein:

FIG. 4 illustrates an exploded cross section view of the example pet toy;

FIG. 5 illustrates an exploded perspective view of the example pet toy;

DETAILED DESCRIPTION

Figure 1:
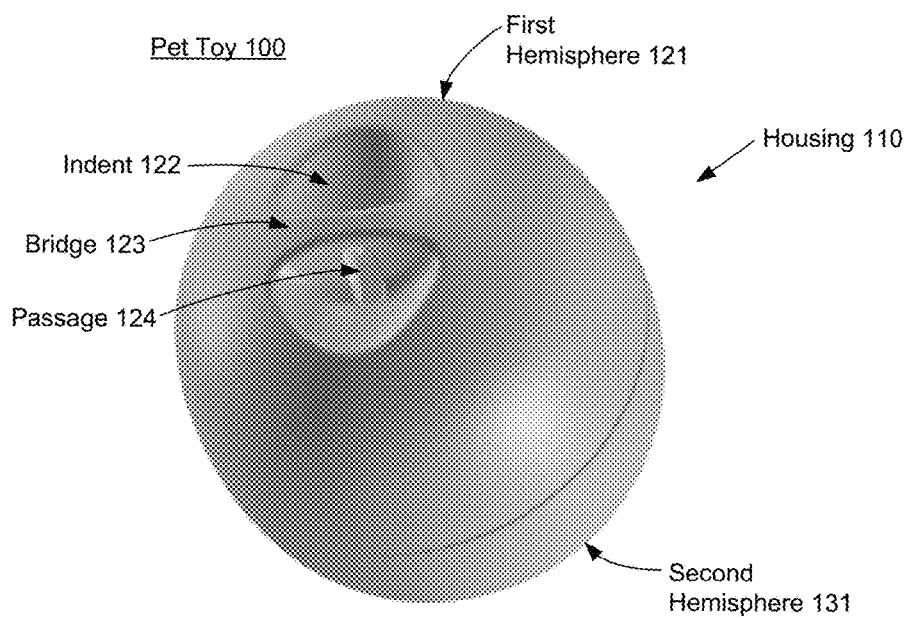
FIG. 1 illustrates a first perspective view an example pet toy.

Prior to explaining embodiments of the invention in detail, it is to be understood that this disclosure is not limited to the details of construction or arrangements of the components and method steps set forth in the following description or illustrated in the drawings. Embodiments of this disclosure are capable of other embodiments and of being practiced and carried out in various ways. Also, it is to be understood that the phraseology and terminology employed herein are for the purpose of the description and should not be regarded as limiting.

Pet toys with edible formulations are disclosed. This disclosure describes one example pet toy in detail. The described example pet toy is substantially spherical and comprises releasably couplable hemispheres. However, it will be appreciated that the described pet toy may be modified in numerous ways without departing from the spirit of this disclosure. For example, some embodiments may be cubical or otherwise non-spherical. Some embodiments may comprise more than two releasably couplable members. In general, pet toys according to this disclosure may comprise any releasably couplable members, which members may be releasable and re-couplable by pet owners, and not by the pets themselves, the members including edible formulations bonded inside one or more of the releasably couplable members, so that the edible formulations are inaccessible by the pet when the members are coupled together, and the edible formulations are accessible by the pet when the members are released or decoupled.

FIGS. 1-8 illustrate an example substantially spherical pet toy 100. In general, pet toy 100 may include a substantially spherical housing comprising a first hemisphere and a second hemisphere, which are releasably couplable. An edible formulation may be bonded to an internal sidewall inside at least one of the first and second hemispheres. The edible formulation may be accessible by releasing the first hemisphere from the second hemisphere, such that the edible formulation is accessible by a pet by decoupling the hemispheres, and the edible formulation may otherwise be inaccessible by the pet when the hemispheres are coupled together. Furthermore, in some embodiments, a scent agent may optionally be disposed inside a hemisphere, and such hemisphere may comprise perforations to release scent from the scent agent.

Figure 2:
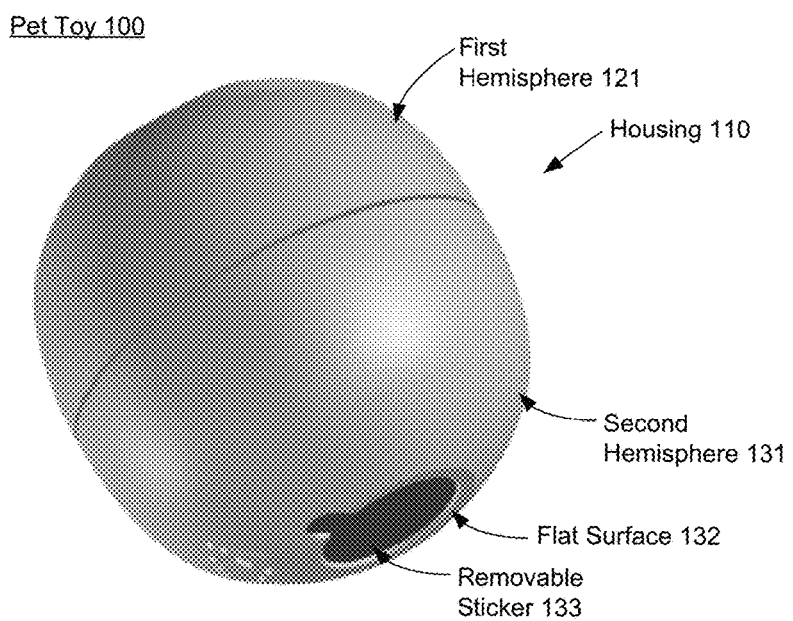
FIG. 2 illustrates a second perspective view of the example pet toy illustrated in FIG. 1.

FIGS. 1 and 2 illustrate first and second perspective views the example pet toy 100, in accordance with at least some embodiments of the present disclosure. The illustrated pet toy 100 comprises a substantially spherical housing 110, the housing 110 comprising a first hemisphere 121 and a second hemisphere 131. The first hemisphere 121 and second hemisphere 131 are releasably couplable together, as described in further detail herein. FIGS. 1 and 2 illustrate first hemisphere 121 as coupled with second hemisphere 131.

FIG. 1 shows features of first hemisphere 121, including indent 122, bridge 123, and passage 124. Indent 122 comprises first and second indent portions, separated by bridge 123. Passage 124 passes under bridge 124, thereby passing from the first to the second indent portion. Indent 122, bridge 123, and passage 124 may allow for connecting accessories to first hemisphere 121, as described herein.

FIG. 2 shows features of second hemisphere 131, including flat surface 132 and removable sticker 133. Flat surface 132 may be disposed at a bottom of second hemisphere 131, as shown. Removable sticker 133 may be positioned over flat surface 132. In some embodiments, second hemisphere 131 may comprise perforations on flat surface 132, which perforations may be covered by removable sticker 133.

In some embodiments, substantially spherical housing 110 may be made of plastic, and may be, e.g., between 0.75 and 2.5 inches in diameter. In some embodiments, substantially spherical housing 110 may comprise a matte finish surface coating. In alternative embodiments, housing 110 may include other materials such as rubber, metal, glass, resin or wood; housing 110 may take another shape such as a polygon or cube; housing 110 may have any surface finish, such as smooth, rough or bumpy; and housing 110 may optionally comprise more than two members, e.g., housing 110 may optionally comprise a middle member between first hemisphere 121 and second hemisphere 131, wherein the middle member may be releasably couplable from both first hemisphere 121 and second hemisphere 131.

Figure 3:
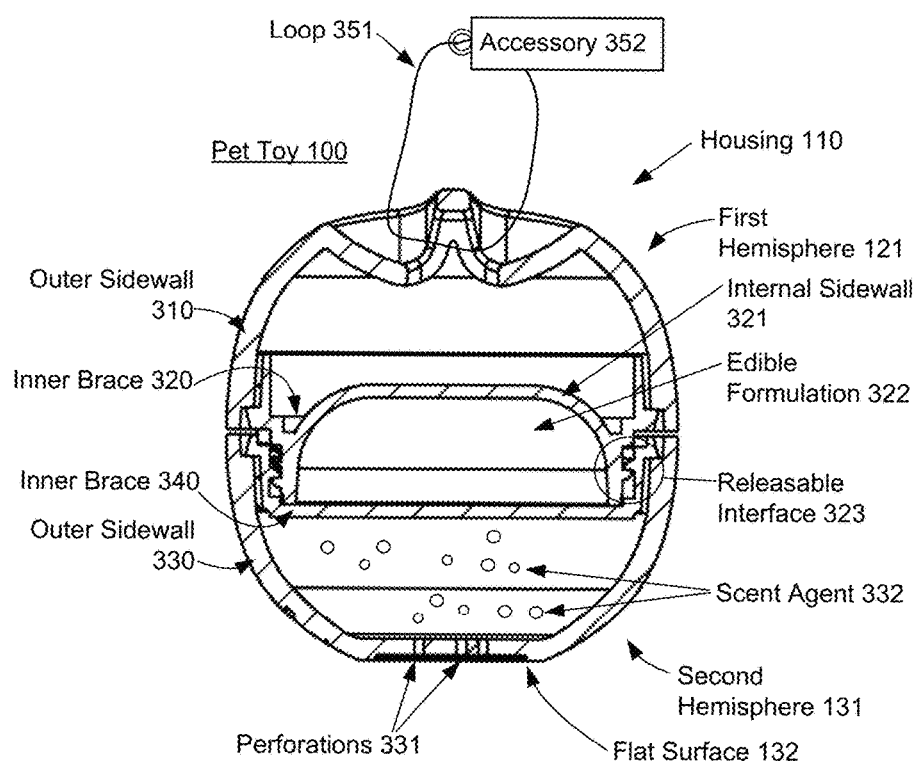
FIG. 3 illustrates a front cross section view of the example pet toy.

FIG. 3 illustrates a front cross section view of the example pet toy 100, in accordance with at least some embodiments of the present disclosure. As illustrated in FIG. 3, first hemisphere 121 may comprise an outer sidewall 310 coupled with an inner brace 320. Second hemisphere 131 may comprise an outer sidewall 330 coupled with an inner brace 340. The inner braces 320, 340 may comprise interface structures to couple with one another, to thereby form a releasable interface 323 which releasably couples first hemisphere 121 and second hemisphere 131.

FIG. 3 furthermore illustrates internal sidewall 321, included on inner brace 320. An edible formulation 322 may be bonded to internal sidewall 321, inside first hemisphere 121. The edible formulation 322 is accessible by releasing the first hemisphere 121 from the second hemisphere 131, and the edible formulation 322 is inaccessible when the first hemisphere 121 is coupled with the second hemisphere 131, e.g., as illustrated in FIG. 3.

FIG. 3 furthermore illustrates a scent agent 332 disposed inside second hemisphere 131. Scent agent 332 may be enclosed between outer sidewall 330 and inner brace 340. In some embodiments, scent agent 332 may comprise, e.g., a loosely packed catnip. Alternatively, scent agent 332 may comprise any substance which emits a scent that is interesting to pets. Perforations 331 are illustrated at the bottom of second hemisphere 131, on flat surface 132. Perforations 331 may allow scent from scent agent 332 to escape second hemisphere 131, without allowing scent agent 332 itself to escape. A perforation 331 diameter may be smaller than a scent agent unit diameter, so that, e.g., individual particles of scent agent 332 are prevented from escaping second hemisphere 131.

FIG. 3 furthermore illustrates an accessory 352 attachable to the pet toy 100 at the bridge. Accessory 352 may comprise, e.g., a laser, a small toy such as a rubber mouse, a noisemaker such as a bell, or another object of interest to a pet. Accessory 352 may be attachable, e.g., by a loop 351, which may optionally be attachable and detachable from pet toy 100. Loop 351 may comprise, e.g., a string, a wire, or other material. In some embodiments, loop 351 may be replaced by a tether.

In FIG. 3, the edible formulation 322 is bonded to internal sidewall 321 inside only the first hemisphere 121, and the scent agent 332 is disposed inside only the second hemisphere 131. In alternative embodiments, edible formulation 322 may be bonded to an internal sidewall inside only the second hemisphere 131, or edible formulation 322 may be bonded to internal sidewalls inside both the first hemisphere 121, and the second hemisphere 131. Likewise, scent agent 332 may be disposed inside only the first hemisphere 121, or scent agent 332 may be disposed inside both the first hemisphere 121 and the second hemisphere 131.

In some embodiments, the edible formulation 322 may comprise a p-syrup with meat or fish flavoring, such as a chicken, salmon, or tuna flavoring. The quantity of edible formulation 322 may depend on the dimensions of internal sidewall 321. For example, in some embodiments, the edible formulation 322 may weigh between 0.25 and 2.5 ounces. The diameter of edible formulation 322 may optionally be larger than its depth, as shown. The edible formulation 322 may optionally be heated and poured into the internal sidewall 321. As it cools, the edible formulation 322 may harden and bond with the internal sidewall 321, so that, for example, the first hemisphere 121 may be inverted (as shown) without the edible formulation 322 falling out. The edible formulation 322 may have sufficient hardness to withstand licking by a pet while remaining generally intact and bonded with the internal sidewall 321.

FIG. 4 illustrates an exploded cross section view of the example pet toy 100, in accordance with at least some embodiments of the present disclosure. FIG. 4 illustrates components of first hemisphere 121 including outer sidewall 310, inner brace top 421, and inner brace bottom 420. Inner brace top 421 and inner brace bottom 420 are component parts of inner brace 320, illustrated in FIG. 3. FIG. 4 also illustrates components of second hemisphere 131 including inner brace 340 and outer sidewall 330.

In some embodiments, the various illustrated components of the first hemisphere 121 and the second hemisphere 131 may be separately molded pieces. Thus first hemisphere 121 and the second hemisphere 131 may each comprise a separately molded outer sidewall 310 or 330, molded separately from the inner braces 340 or 420, 421. The outer sidewalls 310 and 330 may each comprise interfaces in order to couple with the inner braces 340 or 420, 421. In alternative embodiments, any of the various illustrated components of the first hemisphere 121 or the second hemisphere 131 may molded as a single piece.

FIG. 4 illustrates interfaces on the various components of first hemisphere 121 and second hemisphere 131. An interface 411 on outer sidewall 310 couples with an interface 422 on inner brace bottom 420. An interface 423 on inner brace bottom 420 couples with an interface 441 on inner brace 340. An interface 442 on inner brace 340 couples with an interface 431 on outer sidewall 330. In general, the illustrated interfaces may include any of a wide variety of interface types. The interfaces 423 and 441 may form a releasable interface, illustrated in FIG. 3 as releasable interface 323. The various other illustrated interfaces may or may not be releasable, depending on the desired configuration for pet toy 100.

In embodiments according to FIG. 4, the first hemisphere 121 and second hemisphere 131 each comprise an inner brace. First hemisphere 121 comprises inner brace 420, 421, and second hemisphere 131 comprises inner brace 340. The inner braces comprise releasably coupling interfaces to releasably couple the first and second hemispheres.

In some embodiments, the releasable interface 323 formed by interfaces 423 and 441 may comprise a twist and click interface. The twist and click interface may comprise, e.g., male and female threads which are twisted together, e.g., with male threaded interface 423 twisted into female threaded interface 441. The threads may comprise a click-in element, such as a raised node on interfaces 423 and 441, which clicks into place to secure the interfaces 423 and 441 in a coupled position.

In some embodiments, the interfaces 411 and 422 may releasably couple together, e.g., to allow replacement of inner brace 420, 421 along with edible formulation 322. For example, interface 422 may comprise one or more protruding elements, which fit into matching depressions on interface 411. The protrusions may be made to sufficiently loosely fit into the matching depressions, so that inner brace 420, 421 may be pulled from outer sidewall 310 with sufficient force. Alternatively, in some embodiments the interfaces 411 and 422 may couple together in a non-releasable manner, e.g., by a tight fit between protrusions and matching depressions, so that the interfaces 411 and 422, once coupled, cannot be pulled apart. In some embodiments, at least inner brace 420, 421 may be made from a food grade material.

In some embodiments, the interfaces 442 and 431 may releasably couple together, e.g., to allow replacement of scent agent 332. For example, interface 442 may comprise one or more protruding elements, which fit into matching depressions on interface 431. The protrusions may be made to sufficiently loosely fit into the matching depressions, so that inner brace 340 may be pulled from outer sidewall 330 with sufficient force. Alternatively, in some embodiments the interfaces 442 and 431 may couple together in a non-releasable manner, e.g., by a tight fit between protrusions and matching depressions, so that the interfaces 442 and 431, once coupled, cannot be pulled apart.

FIG. 5 illustrates an exploded perspective view of the example pet toy 100, in accordance with at least some embodiments of the present disclosure. FIG. 5 shows outer sidewall 310, elements of the inner brace including inner brace top 421 and inner brace bottom 420, inner brace 340, outer sidewall 330, and removable sticker 133. FIG. 5 provides another view of elements previously described herein, wherein like elements are assigned like identifiers.

Figure 6:
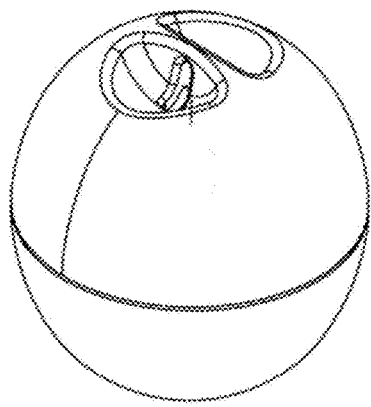
FIG. 6 illustrates another perspective view the example pet toy.

FIG. 6 illustrates another perspective view the example pet toy 100, in accordance with at least some embodiments of the present disclosure. FIG. 6 provides another view of elements previously described herein, as will be appreciated.

Figure 7:
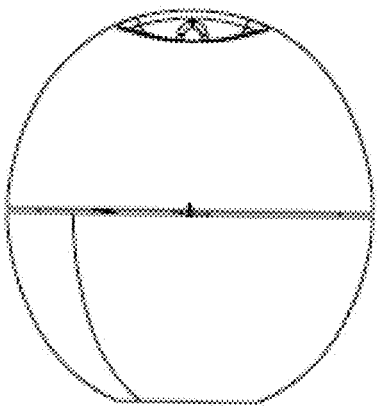
FIG. 7 illustrates a front elevation view the example pet toy.

FIG. 7 illustrates a front elevation view the example pet toy 100, in accordance with at least some embodiments of the present disclosure. FIG. 7 provides another view of elements previously described herein, as will be appreciated.

Figure 8:
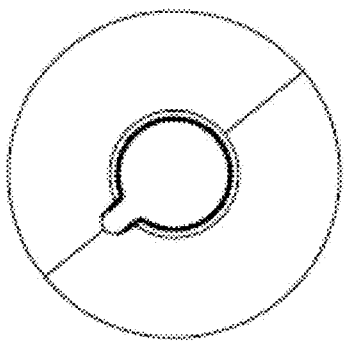
FIG. 8 illustrates a bottom view the example pet toy; all in accordance with at least some embodiments of the present disclosure.

FIG. 8 illustrates a bottom view the example pet toy 100, in accordance with at least some embodiments of the present disclosure. FIG. 8 provides another view of elements previously described herein, as will be appreciated.

While various embodiments have been disclosed herein, other aspects and embodiments will be apparent to those skilled in art.

The invention claimed is:

1. A pet toy, comprising:
a substantially spherical housing comprising a first hemisphere and a second hemisphere;
wherein the first and second hemispheres are releasably couplable; and
an edible formulation bonded to an internal sidewall inside at least one of the first and second hemispheres, wherein the first and second hemispheres provide a substantially continuous barrier surrounding the edible formulation, so that the edible formulation is accessible only by releasing the first hemisphere from the second hemisphere.

2. The pet toy of claim 1, further comprising a scent agent disposed inside at least one of the first and second hemispheres.

3. The pet toy of claim 2, further comprising one or more perforations in a hemisphere comprising the scent agent, wherein a perforation diameter is smaller than a scent agent unit diameter.

4. The pet toy of claim 3, further comprising a removable sticker over the one or more perforations.

5. The pet toy of claim 3, wherein the one or more perforations are at a bottom of the second hemisphere.

6. The pet toy of claim 5, wherein said bottom of the second hemisphere comprises a flat surface.

7. The pet toy of claim 2, wherein the scent agent comprises a loosely packed catnip.

8. The pet toy of claim 2, wherein the edible formulation is bonded to an internal sidewall inside only the first hemisphere, and wherein the scent agent is disposed inside only the second hemisphere.

9. The pet toy of claim 1, wherein the substantially spherical housing is between 0.75 and 2.5 inches in diameter.

10. The pet toy of claim 1, wherein the substantially spherical housing is made of plastic.

11. The pet toy of claim 3, wherein the substantially spherical housing comprises a matte finish surface coating.

12. The pet toy of claim 1, wherein the first and second hemispheres are releasably couplable by a twist and click interface.

13. The pet toy of claim 1, wherein the edible formulation weighs between 0.25 and 2.5 ounces.

14. The pet toy of claim 1, wherein the edible formulation comprises a p-syrup with meat or fish flavoring.

15. The pet toy of claim 1, wherein at least one of the first and second hemispheres comprises an inner brace, and wherein the inner brace comprises the internal sidewall to which the edible formulation is bonded.

16. The pet toy of claim 15, wherein the inner brace is removable and replaceable within the at least one of the first and second hemispheres.

17. The pet toy of claim 16, wherein the first and second hemispheres each comprise an inner brace, and wherein the inner braces comprise releasably coupling interfaces to releasably couple the first and second hemispheres.

18. The pet toy of claim 17, wherein the first and second hemispheres each comprise a separately molded outer sidewall, molded separately from the inner braces and comprising interfaces in order to couple with the inner braces.

19. The pet toy of claim 1, wherein the substantially spherical housing comprises an exterior indent divided by a bridge.

20. The pet toy of claim 19, further comprising at least one accessory attachable to the pet toy at the bridge.

21. The pet toy of claim 20, wherein the at least one accessory comprises a laser.

* * * * *